Nov. 24, 1942. W. L. MORRISON 2,303,170
WINDOW FOR VEHICLES
Original Filed Feb. 15, 1933 4 Sheets-Sheet 1
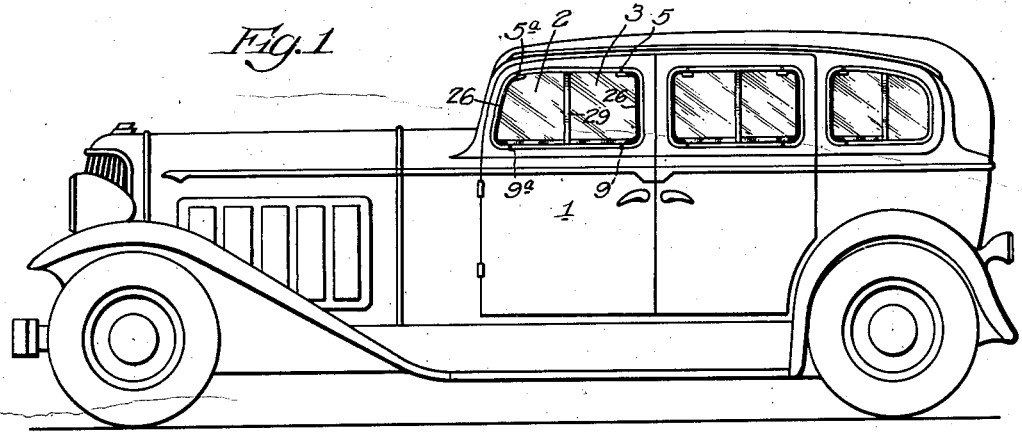
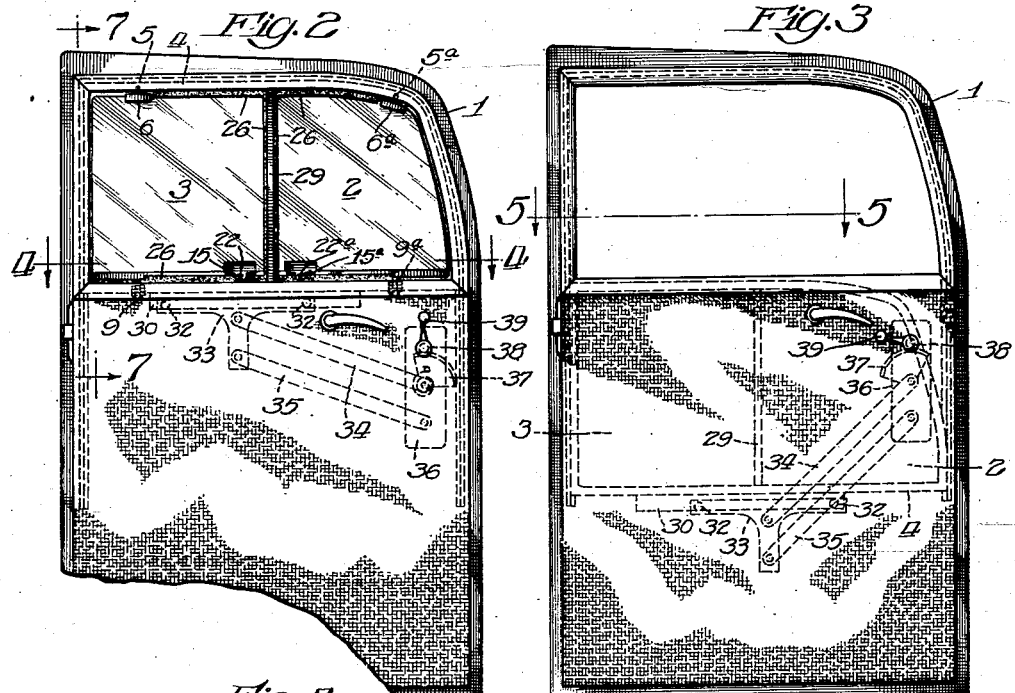
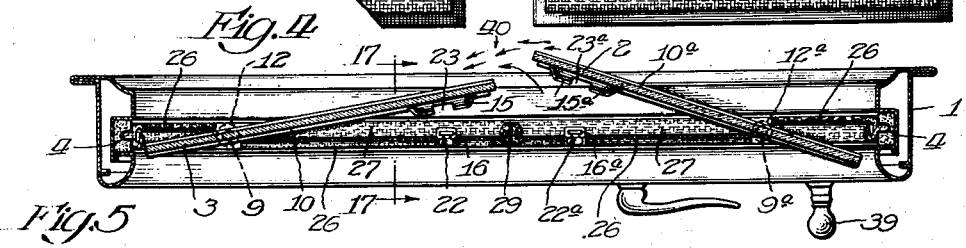

Nov. 24, 1942.  W. L. MORRISON  2,303,170
WINDOW FOR VEHICLES
Original Filed Feb. 15, 1933   4 Sheets-Sheet 2
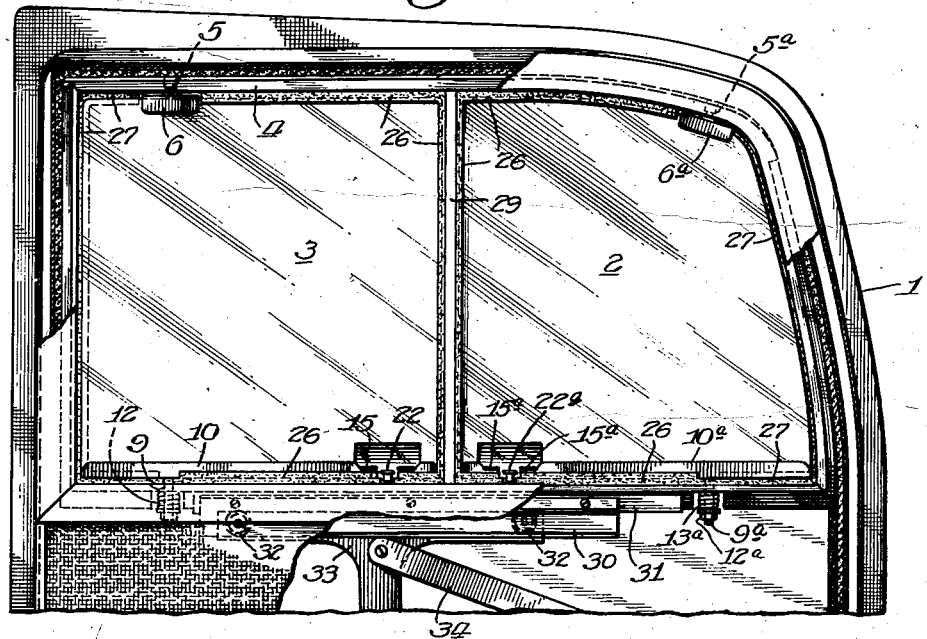
 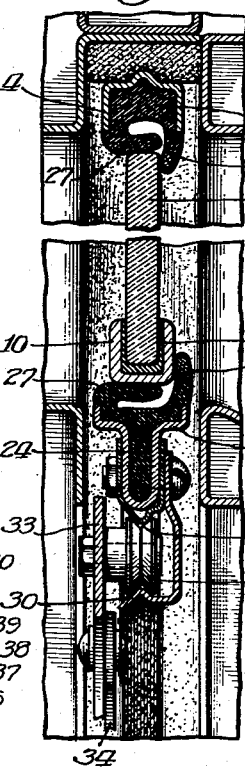 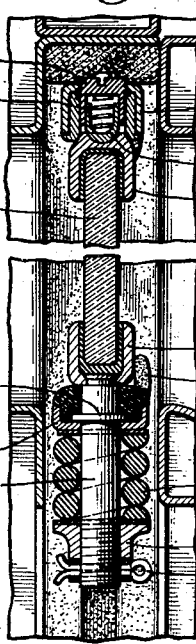 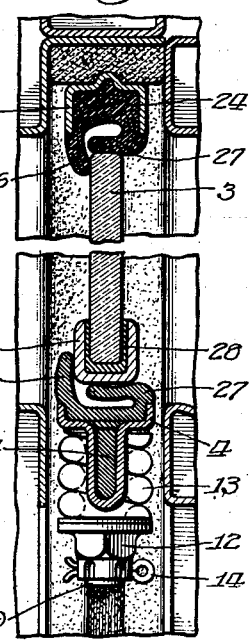
Inventor
Willard L. Morrison
By Parker & Carter Attys

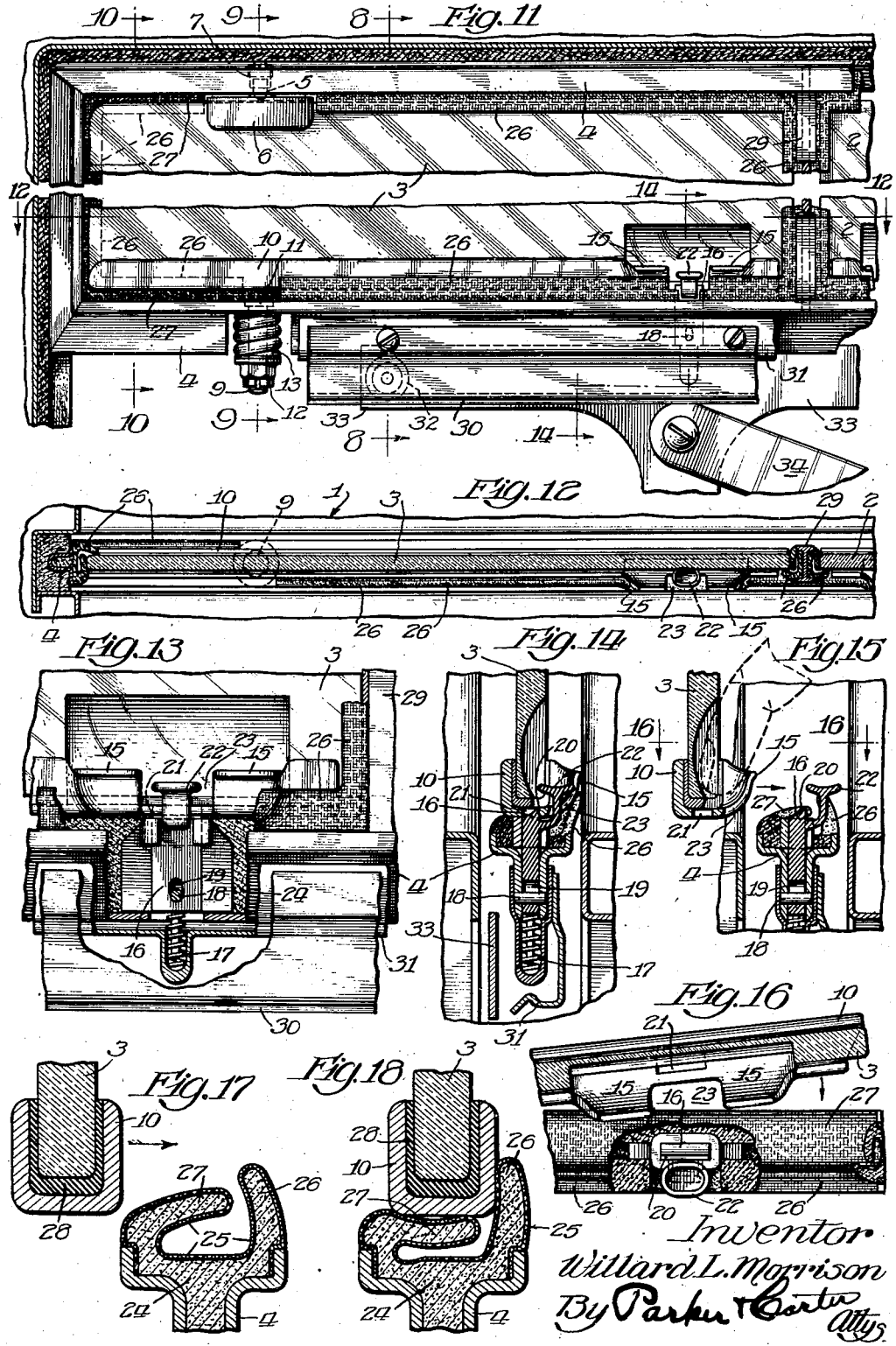

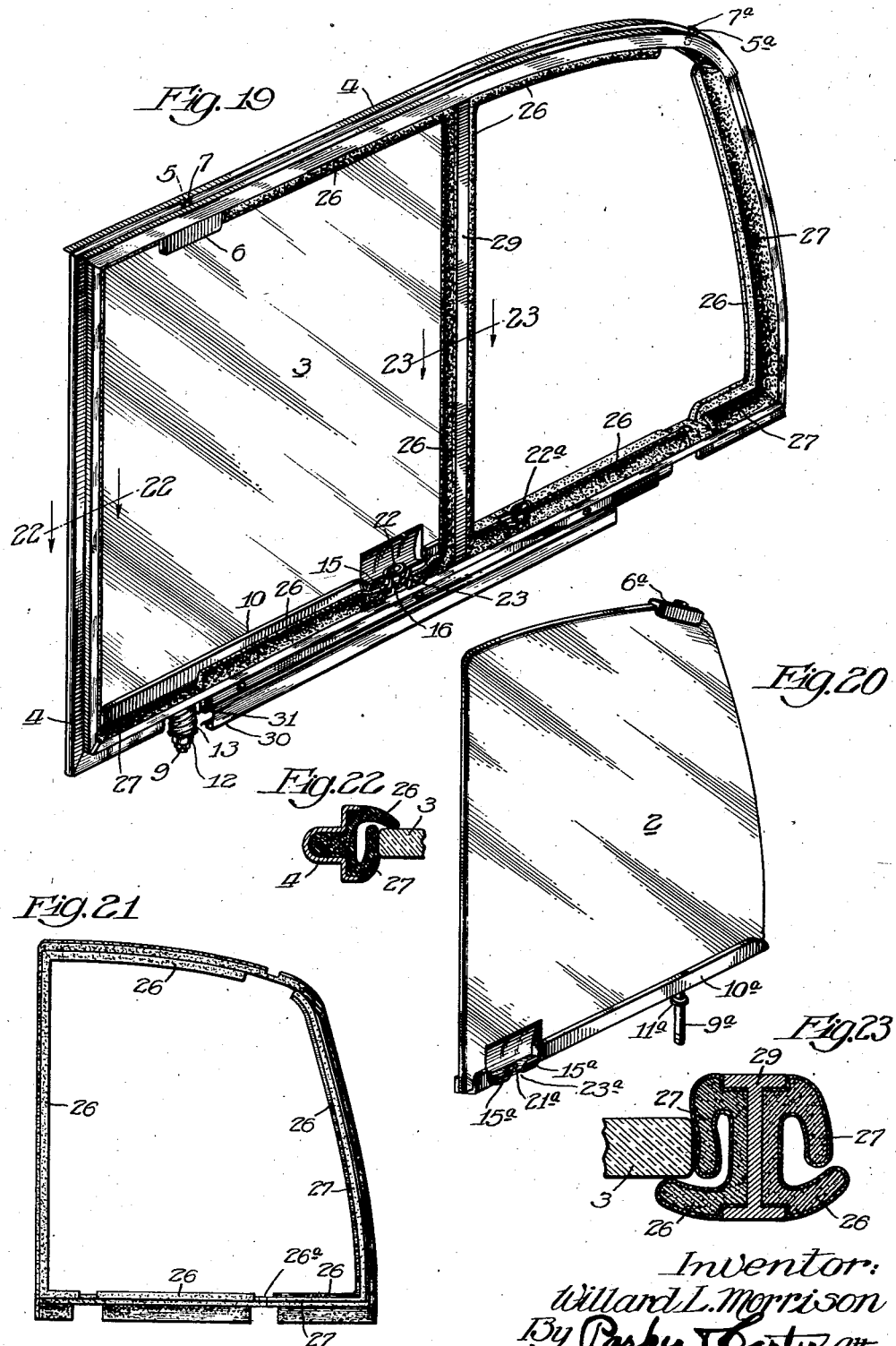

Patented Nov. 24, 1942

2,303,170

UNITED STATES PATENT OFFICE 2,303,170

WINDOW FOR VEHICLES

Willard L. Morrison, Lake Forest, Ill.

Application February 15, 1933, Serial No. 656,809
Renewed September 27, 1939

5 Claims. (Cl. 296—44)

This invention relates to windows for vehicles and has for its object to provide a new and improved device of this description. The invention has as a further object to provide a window for vehicles by means of which the ventilation of the vehicle may be secured and controlled. The invention has as a further object a provide a window for vehicles which may be made up separate from the vehicle and applied thereto. The invention has as a further object to provide a window for vehicles which consists of a unitary, self-contained structure. The invention has as a further object to provide an adjustable window for vehicles with sealing means therefor. The invention has other objects which are more particularly pointed out in the accompanying description.

Referring now to the drawings,

Fig. 1 is a view of a vehicle showing one form of window embodying the invention;

Fig. 2 is an enlarged view of the inner face of the door of the car showing the window in closed position;

Fig. 3 is a view similar to Fig. 2 showing the window glass in lowered position;

Fig. 4 is an enlarged sectional view taken on line 4—4 of Fig. 2;

Fig. 5 is a fragmentary sectional view taken on line 5—5 of Fig. 3;

Fig. 6 is an enlarged inside view of the window with parts broken away;

Fig. 7 is an enlarged sectional view taken on line 7—7 of Fig. 2;

Fig. 8 is an enlarged sectional view with parts broken away taken on line 8—8 of Fig. 11.

Fig. 9 is an enlarged sectional view with parts broken away taken on line 9—9 of Fig. 11;

Fig. 10 is an enlarged sectional view with parts broken away taken on line 10—10 of Fig. 11;

Fig. 11 is an enlarged view with parts broken away of the front window section in closed position;

Fig. 12 is a sectional view taken on line 12—12 of Fig. 11;

Fig. 13 is an enlarged view with parts broken away showing the fastening device for the window section;

Fig. 14 is an enlarged sectional view taken on line 14—14 of Fig. 11 showing the window section closed;

Fig. 15 is a view similar to Fig. 14 showing the window section just before it is moved to its closed position;

Fig. 16 is an enlarged sectional view taken on line 16—16 of Fig. 15;

Fig. 17 is a sectional view taken on line 17—17 of Fig. 4;

Fig. 18 is a view similar to Fig. 17 showing the window section moved to its closed position;

Fig. 19 is a view showing the frame with the rear glass section in position, and associated parts forming the unitary structure, ready to be placed in position, the front glass section being removed;

Fig. 20 is a view showing the removed front glass section separate from the frame;

Fig. 21 is a view showing the sealing device for the edges of the front glass section;

Fig. 22 is a sectional view taken on line 22—22 of Fig. 19;

Fig. 23 is a sectional view taken on line 23—23 of Fig. 19.

Like numerals refer to like parts throughout the several figures.

Referring now to the drawings, I have illustrated in Fig. 1 an automobile provided with windows embodying the invention. In this construction the window opening in the front door 1, for example, has two glass sections 2 and 3. These glass sections are mounted in a frame member 4, one form of which is shown separate from the vehicle in Fig. 19. This frame with the glass sections in it is mounted in the window opening of the door. The glass sections 2 and 3 are pivotally mounted in the frame, the glass section 2 near its front and the glass section 3 near its rear. The pivotal mounting is similar in each case and the details will be described in connection with the glass section 3.

This section is pivotally mounted to the frame 4 at the top by a pivot 5 of any suitable construction. For purposes of manufacture and easy assembly, I have shown a particular form of pivot which consists of a hollow member rounded at its lower end and received in an opening in the glass engaging member 6, see Fig. 9. There is an opening in the frame 4 and the pivot 5 is inserted in this opening and is held in place by the enclosing member 7 which is screw threaded into the frame 4. A spring 8, inserted between the end of the holding member 7 and the pivot, elastically holds it in position.

Section 2 has a similar upper pivot and is marked with similar reference numerals having the exponent a. The section 2 is pivoted to the frame 4 at the bottom by a pivot arranged with a frictional engagement so that the glass member will remain in any angular position to which it is moved. In the particular construction shown this pivot 9 is attached to a glass engaging member 10, see Fig. 9, passes through the lower member of the frame 4, and has a shoulder 11. The lower end of the pivot is screw threaded and there is a nut 12 thereon, and between the nut and the frame 4 is a spring 13. It will be seen that when the nut 12 is tightened the spring will be compressed and this pressure will exert a friction which resists the pivotal movement of the glass.

I prefer to provide washers between the ends of the spring and the frame 4 and nut 12. There is also a locking device 14 for the nut 12. The front glass section 2 has a similar pivotal connection to the frame and the parts thereof are given the same reference numerals with the exponent a.

Some means is provided for moving the glass sections about their pivots and for holding them in their closed positions. As herein shown the glass engaging part 10 extends along the bottom of the glass section, and at a distance from the pivot 9 there is a finger piece 15, see Figs. 11, 13, 14, and 15. Connected with the frame 4 is a locking member 16 which is pressed toward the member 10 by a spring 17. This locking member is held in place by a pin 18 which passes through an enlarged opening 19 therein, see Fig. 14. The locking member 16 has an engaging end 20 which fits into an opening 21 in the member 10, and when in this position holds the section in its closed position. The locking member 16 has a controlling handle 22 by means of which it may be disengaged. When this handle is pushed down the locking member is pushed down so as to release the glass section. The glass section can then be pushed out to any desired inclined position. The finger piece 15 is cut away at 23, see Figs. 11 and 16, so that it does not interfere with the controlling handle 22 when the glass section is moved outwardly.

The section 2 has a similar arrangement and construction of parts which are designated with the same reference numerals with the exponent a.

The glass sections are arranged so that when they are closed an air and water tight joint is made along the edges. The frame 4 is provided with non-metallic sealing pieces arranged to secure these sealed joints. It will be seen that since the two sections 2 and 3 are pivotally connected to the frame 4 intermediate their ends, one part of each section moves inwardly and the other part outwardly when the sections are moved about their pivotal connections. This prevents the ordinary sealing means from being used, as the sealing means must be arranged to permit this opposite movement of the two ends and at the same time to seal them when the sections are closed.

Any suitable sealing means may be used, and I have illustrated a preferred form, which consists of some suitable material, such as some rubber compound 24, see Figs. 17 and 18, which is covered by a fabric 25. The frame 4 is grooved to receive the sealing pieces and these sealing pieces preferably have two members, the member 26 which engages the side edge of the section and the member 27 which engages the bottom edge.

The glass engaging member 10, which may be of metal, preferably has a non-metallic lining 28 between it and the glass, as shown for example in Fig. 17. When the section 3, for example, is in its open position or partially open, as shown in Fig. 17, the sealing members 26 and 27 are preferably in the position shown in that figure. When the section 3 is moved to its closed position, the bottom of the glass engaging member 9 presses upon the member 27 and presses it downwardly and presses on the member 26 and presses it outwardly so that there will be two sealing joints, one at the bottom and one at the side, as clearly shown in Fig. 18. These figures show the sealing members at the bottom of section 3. The sealing members at the top and ends are similarly arranged. Fig. 23, for example, shows the sealing arrangement at the middle of the frame 4, that is at the meeting of the adjacent edges of the sections 2 and 3. At the middle of the frame 4 is a cross member 29 of metal, which is preferably in the form of an eye, and it is embedded in the sealing metal and is provided with similar sealing means, consisting of the members 26 and 27. At this point the sections 2 and 3 do not have any glass engaging member, but the glass itself engages the sealing members, as shown in Fig. 23. At the rear end of section 3 and the front end of section 2 the glass itself engages the sealing members 26 and 27, as shown in Fig. 22. In view of the opposite movement of the parts of section 3, for example, on opposite sides of the pivot, the sealing member 26 must be on the outside at the rear end, or at the left hand side of the pivot of section 3, as shown in Fig. 4. The sealing members must be on the inside in front of the pivot, or on the right of the pivot as shown in Fig. 4, both at the top and bottom and front and rear ends.

The sealing member 26 for section 2 is arranged oppositely to that of section 3, since section 2 is pivoted near its front end. Fig. 4 shows the position of the sealing member 26 for section 2, such sealing member being on the inside at the left of the pivot of section 2 and on the outside at the right of the pivot of section 2. Fig. 21 shows this arrangement of the sealing member 26 for section 2.

Referring to this figure, the pivot of section 2 is located at 26a, and the part of the member 26 on the right of 26a is on the inside. It will be seen that by this arrangement the two sections 2 and 3 are tightly secured when in their closed positions.

Some means is provided for lowering both sections 2 and 3 and the frame with which they are connected into a recess below the window opening. In the construction shown this is accomplished by the following mechanism. Attached to the frame 4 are the tracks 30 and 31, see Figs. 11 and 8. Running along these tracks are the wheels 32, the wheels being grooved to receive the tracks, as shown in Fig. 8. These wheels are mounted upon a movable support 33 to which are pivotally connected the links 34 and 35. These links are also pivotally connected to a fixed part 36 on the door, see Fig. 2. Connected with one of these links is a rack 37 which is engaged by a pinion 38 connected with a crank 39. When the sections 2 and 3 and the frame 4 are up in their upmost position in the window opening, the parts are in the position shown in Fig. 2. When it is desired to lower the frame 4 and the sections 2 and 3, the crank 39 is rotated and this rotates the pinion 38 and the segmental rack 37, causing the frame and sections 2 and 3 to be lowered to the dotted position, as shown in Fig. 3. During this movement the wheels and the movable support 33 move along the tracks 30 and 31. The frame 4 and sections 2 and 3 are moved upwardly to their initial position by reversing the rotation of the crank 39.

I have explained the construction of the parts with relation to the front door of the automobile. The same arrangement may be made in the rear doors and at the rear windows. The raising and lowering mechanism may, of course, be omitted if desired, and would be omitted in the rear windows.

The use and operation of my invention are as follows:

When the sections 2 and 3 are used for ventilating purposes they are moved to an angular position, the position depending upon the result desired. If, for example, these sections 2 and 3 are moved to a position like that shown in Fig. 4 the air, due to the motion of the automobile, strikes the outside of section 2 and moves therealong, passing the space 40 between the two sections and producing a suction which draws air out of the automobile between the sections 2 and 3, the direction of air being indicated by the arrows. It will be seen that by means of this arrangement the car may be easily and quickly and fully ventilated by the drawing of the air out between the sections 2 and 3 and that this may be done without drafts, and that the ventilation may be easily controlled and regulated by simply changing the position of the sections 2 and 3.

It will further be seen that these sections will be held in any position to which they are moved by the friction device associated with the pivots. In view of the fact that the front sections 2 are pivoted between their ends the air may be directed along the inside of the wind shield, thus preventing the wind shield from becoming clouded or the vision obstructed by condensation of vapor thereon.

When it is desired to signal, the section 3 may be moved out far enough to insert the hand between the two sections. When it is desired to close the two sections they are moved by grasping the hand pieces thereon. It will be noted that these hand pieces are so located that the hand pieces are moved inwardly to close the sections and outwardly to open them. When moved to a closed position the two sections are tightly sealed so as to make a substantially rain proof and air proof joint all around the edges thereof.

I claim:

1. A window for vehicles comprising a frame adapted to be placed in the window opening of the vehicle, a glass section pivotally connected therewith by means of upper and lower pivots, the upper pivot being hollow and being received in an opening in the frame, a glass engaging member connected with said section with which said pivot contacts, and a removable enclosing member connected with said frame for removably enclosing the pivot.

2. A window for vehicles comprising a frame adapted to be placed in the window opening of the vehicle, a glass section associated therewith, a glass engaging member at the bottom of said glass section, a pivot connected with said glass engaging member and pivotally connecting it with said frame, a locking piece movably mounted in said frame and adapted to engage said glass engaging member to hold the section in its closed position, a controlling handle for said locking device by means of which it may be moved to its unlocking position to release said section, and a finger piece connected with said glass engaging part by means of which it may be moved about its pivot, said handle and finger piece being normally within the plane of said frame.

3. A window for vehicles comprising a frame adapted to be placed in the window opening of the vehicle, a glass section associated therewith, a glass engaging member at the bottom of said glass section, a pivot connected with said glass engaging member and pivotally connecting it with said frame, two separate locking parts, in vertical alignment with the glass section, one on the glass section and one on the frame, both of said locking parts located on the interior of the vehicle and inaccessible from the exterior of the vehicle, said locking parts being movable relatively to disengage them to move the glass section to its open position and to engage them to bring them into locking engagement to hold the glass section in its closed position and prevent movement thereof, said locking parts being disconnected when the window section is in its open position.

4. A window for vehicles comprising a frame adapted to be placed in the window opening of the vehicle, a glass section associated therewith, a glass engaging member at the bottom of said glass section, a pivot connected with said glass engaging member and pivotally connecting it with said frame, two separate locking parts in vertical alignment with the glass section, one on the glass section and one on the frame, both of said locking parts located on the interior of the vehicle and inaccessible from the exterior of the vehicle, said locking parts being movable relatively to engage them to bring them into locking engagement, said locking parts when in locking engagement holding the glass section against movement in either direction, said locking parts being disconnected to open the window section.

5. A window for vehicles comprising a frame adapted to be placed in the window opening of the vehicle, a glass section associated therewith, a glass engaging member at the bottom of said glass section, a pivot connected with said glass engaging member and pivotally connecting it with said frame, sealing material connected with said frame for sealing the edges of said glass section when in its closed position, two separate locking parts in vertical alignment with said glass section, one on the glass section and one on the frame, both of said locking parts located on the interior of the vehicle and inaccessible from the exterior of the vehicle, said locking parts being movable relatively to connect them to bring them into locking engagement, the sealing material being compressed by moving the glass section to its closed position and being held compressed by said locking parts when in engagement, said locking parts when in locking engagement holding the glass section against movement in either direction, said locking parts being disengaged to open the window section.

WILLARD L. MORRISON.